(12) United States Patent
Masters et al.

(10) Patent No.: US 11,239,996 B2
(45) Date of Patent: Feb. 1, 2022

(54) WEIGHTED PARTIAL MATCHING UNDER HOMOMORPHIC ENCRYPTION

(71) Applicant: INTERNATIONAL BUSINESS MACHINES CORPORATION, Armonk, NY (US)

(72) Inventors: Oliver Paul Masters, Birmingham (GB); Hamish C Hunt, Ashford (GB); Flavio A Bergamaschi, Southampton (GB); Enrico Steffinlongo, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 16/719,056

(22) Filed: Dec. 18, 2019

(65) Prior Publication Data
US 2021/0194668 A1  Jun. 24, 2021

(51) Int. Cl.
| | |
|---|---|
| H04L 9/00 | (2006.01) |
| G06F 21/60 | (2013.01) |
| G06F 16/245 | (2019.01) |
| H04L 9/30 | (2006.01) |

(52) U.S. Cl.
CPC ............ *H04L 9/008* (2013.01); *G06F 16/245* (2019.01); *G06F 21/602* (2013.01); *H04L 9/3073* (2013.01)

(58) Field of Classification Search
CPC ..... H04L 9/008; H04L 9/3073; G06F 16/245; G06F 21/602
See application file for complete search history.

(56) References Cited

U.S. PATENT DOCUMENTS

| | | | |
|---|---|---|---|
| 8,954,749 | B2 | 2/2015 | Thorup et al. |
| 9,288,039 | B1 * | 3/2016 | Monet ................. H04L 9/008 |
| 9,503,432 | B2 | 11/2016 | Emam et al. |
| 9,742,556 | B2 | 8/2017 | Bacon et al. |
| 10,015,007 | B2 | 7/2018 | Bacon et al. |
| 2013/0238646 | A1 | 9/2013 | Maro |
| 2015/0149763 | A1 | 5/2015 | Kamara |
| 2017/0147835 | A1 | 5/2017 | Bacon et al. |

(Continued)

FOREIGN PATENT DOCUMENTS

CN  105138585 A  12/2015

OTHER PUBLICATIONS

"Fully Homomorphic Encryption without Boolstrapping"—Zvika Brakerski et al. (27 Pages).

(Continued)

*Primary Examiner* — Ashokkumar B Patel
*Assistant Examiner* — William B Jones
(74) *Attorney, Agent, or Firm* — Griffiths & Seaton PLLC

(57) ABSTRACT

Various embodiments are provided for performing weighted partial matching under homomorphic encryption in a computing environment. Selected data may be encoded and encrypted into an encrypted query for comparison using private set intersection (PSI) under homomorphic encryption (HE). An encrypted score may be determined according to data blocks of the selected data and a set of weights for each of the data blocks of the selected data to identify matches between the data and the encrypted query. The encrypted score may be decrypted and decoded to identify matches between the encrypted query with the selected data.

17 Claims, 7 Drawing Sheets

(56) References Cited

U.S. PATENT DOCUMENTS

2018/0198601 A1* 7/2018 Laine .............. G06F 9/30014
2020/0364378 A1* 11/2020 Postnikov .............. G06F 21/86

OTHER PUBLICATIONS

"Ring (mathematics)"—wikipedia page (32 Pages).
"Private information Retrieval"—wikipedia page (6 Pages).
"An Implementation of homomorphic encryption"—HElib (1 Page).
"Algorithms in HElib"—Shai Halevi et al. CRYPTO 2014, Part I, LNCS 8616, pp. 554-571, 2014 © International Association for Cryptologic Research 2014.
"Design and Implementation of a Homomorphic"; Shai Halevi et al.; Encryption Library Apr. 11, 2013 (46 Pages).
Ziegeldorf et al. "BLOOM: BLoom filter based oblivious outsourced matchings." BMC medical genomics 10.2 (2017): 44.
Chen et al., "An efficient privacy-preserving ranked keyword search method" EEE Transactions on Parallel and Distributed Systems 2015.
Swamidass et al., "Securely measuring the overlap between private datasets with cryptosets." PloS one 10.2 (2015): e0117898.

* cited by examiner

WEIGHTED PARTIAL MATCHING UNDER HOMOMORPHIC ENCRYPTION

GOVERNMENT LICENSE RIGHTS TO CONTRACTOR-OWNED INVENTIONS MADE UNDER FEDERALLY SPONSORED RESEARCH AND DEVELOPMENT

This invention was made with Government support under Contract No.: 2019-19-020700006 awarded by Intelligence Advanced Research Projects Activity (IARPA). The Government has certain rights in this invention.

BACKGROUND OF THE INVENTION

Field of the Invention

The present invention relates in general to computing systems, and more particularly to, various embodiments for performing weighted partial matching under homomorphic encryption by a processor.

Description of the Related Art

In today's society, consumers, business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computing systems.

SUMMARY OF THE INVENTION

Various embodiments for performing weighted partial matching under homomorphic encryption using one or more processors in a computing environment are provided. In one embodiment, by way of example only, a method performing homomorphic encryption weighted scoring, lookup, and/or retrieval operations, again by a processor, is provided. Selected data may be encoded and encrypted into an encrypted query for comparison using private set intersection (PSI) under homomorphic encryption (HE). An encrypted score may be determined according to data blocks of the selected data and a set of weights for each of the data blocks of the selected data to identify matches between the data and the encrypted query. The encrypted score may be decrypted and decoded to identify matches between the encrypted query with the selected data.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
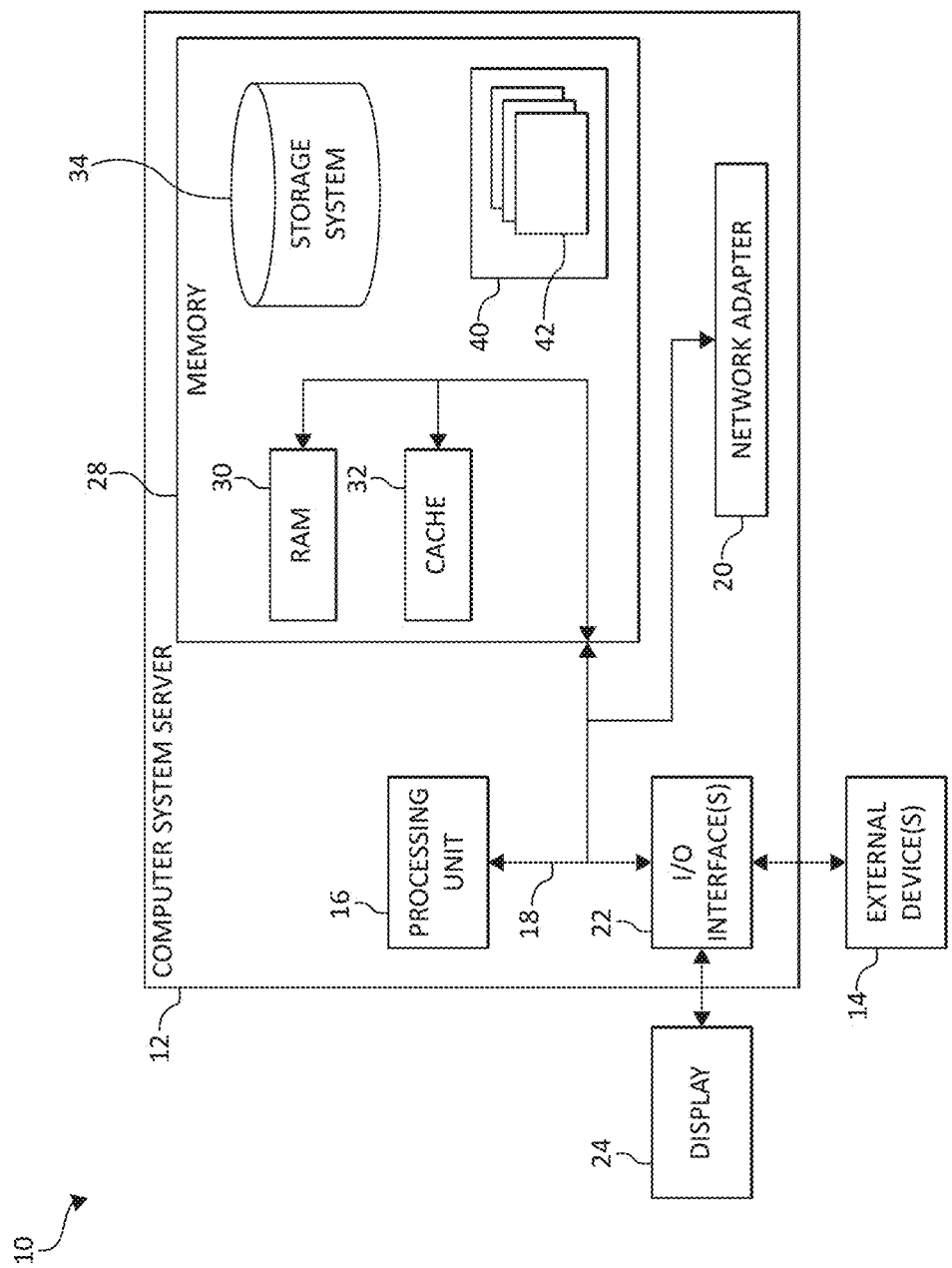
FIG. 1 is a block diagram depicting an exemplary computing node according to an embodiment of the present invention.

Encryption schemes that support operations on encrypted data (aka homomorphic encryption "HE") have a very wide range of applications in cryptography. That is, homomorphic encryption is a form of encryption that allows operations to be carried out on ciphertexts, generating an encrypted result which, when decrypted, matches the result of the same operations performed on the plaintexts corresponding to each of the ciphertexts. Said differently, homomorphic encryption scheme is one wherein one or more operations (e.g., addition, multiplication) performed on two or more ciphertexts translate to the decrypted plaintexts (i.e., the decryption of the ciphertexts).

For example, using a homomorphic encryption scheme, a party (e.g., a client/data owner) may encrypt data and send the encrypted data to a server (e.g., a third party). The server may perform one or more operations (e.g., a computation) on the data without ever decrypting the received, encrypted data and may then send the encrypted results back to the client. The client, who may be the data owner, may decrypt the results since the client has the secret key for decryption. Thus, homomorphic encryption is considered a desirable feature in computing system architectures particularly when a client/data owner intends/desires to send data to a service provider for processing but does not trust the service provider with the data owner's data (e.g., a data owner sends data to a cloud computing system for processing but the data owner does not trust the cloud computing system).

Additionally, private set intersection ("PSI") is an operation that allows two entities holding sets to compare these sets in order to compute the intersection (i.e., neither entities reveals anything to the counterparty except for the elements in the intersection). PSI enables parties to determine an intersection of data elements included within their respective sets of data elements without disclosing any information pertaining to the data elements included in the sets of data elements.

Thus, encrypting, encoding, and decrypting data using various operations to protect data in a computing system is of serious importance. Accordingly, a need exists for providing homomorphic encryption weighted lookup details in order to encode relevant data into plaintext space so as to encrypt and perform a desired homomorphic lookup for relevant data.

In one aspect, the present invention provides for homomorphic encryption weighted scoring and/or lookup/retrieval in a computing system. In one aspect, selected data may be encoded and encrypted into an encrypted query for comparison using private set intersection (PSI) under homomorphic encryption (HE). An encrypted score may be determined according to data blocks of the selected data and a set of weights for each of the data blocks of the selected data to identify matches between the data and the encrypted query. The encrypted score may be obtained via a scoring operation, which then may be used to perform a lookup/retrieval operation. The encrypted score may be decrypted and decoded to identify matches between the encrypted query with the selected data.

In one aspect, the present invention provides for homomorphic encryption scoring and/or lookup/retrieval operations using at least two separate logical computing units (e.g., a computer or secure containers or virtual machines, etc.). In one aspect, a first computing unit may be labeled as a "client" and the second computing unit may be labeled as a "server."

In operation, the client generates homomorphic private and public key pair and other data required such as, for example, switch-key matrices. The client encodes and encrypts the data to be compared by private set intersection (PSI) under Homomorphic Encryption (HE), which may be referred to as a "query". That is, the "query" is the client data that will be compared by PSI by a server. In one aspect, the "encrypted query" is the query encoded and homomorphically encrypted by the client. The encrypted query is then transmitted to the server. The server computes a geometric mean of weighted-offset arithmetic means of matches, which can be interpreted as weighted private set intersection computation that provides a score. That is, for each specific entry, there is either a match or no match. The matches may be binary and is not the overall match score. For example, in a database ("DB") of people, a matched entry could be the same name as the query (e.g., "a match") or different name (e.g., "not a match"). In the same row of the DB, some entries may match and others may not. An overall matching score is given by the score function for that row (i.e., "a geometric mean of weighted-offset arithmetic means of matches" within that row.)

The resulting ciphertext can either be returned to the client providing the partial-matching scores or used for generating an encrypted mask to extract partially-matched information from a database that can then be returned to the client. The latter can be viewed as a partial-match private information retrieval protocol. Once the client has received the encrypted score or encrypted database value, the client can decrypt and decode the resultant ciphertext. This can be modified so that the client can also configure weights and offsets either in the clear, or encoded and encrypted, to be sent to the server for use in either a weighted private intersect score or database lookup.

Before proceeding with additional description of the exemplary embodiments, it should be noted that as used herein a non-negative form of integers modulo p may be used (e.g., use representatives from the set $\{0, 1, \ldots, p-1\}$, however other representations may be possible and used. Additionally, as used herein, the present invention may use the Brakerski-Gentry-Vaikuntanathan ("BGV") homomorphic encryption scheme. However, similar homomorphic encryption schemes may also be used. In the BGV case, the plaintext space is illustrated in the following equation:

$$R = \frac{\mathbb{Z}_p[x]}{\Phi_m(x)}, \quad (1)$$

where p is a prime number, $\mathbb{Z}_p[x]$ is the ring of polynomials in one indeterminate variable with coefficients modulo p, and $\Phi_m(x)$ is the mth cyclotomic polynomial for some natural number m. In one aspect, the present invention may use the isomorphism $R \cong E^n$ for some n, where $$E = \frac{\mathbb{Z}_p[x]}{A(x)},$$

and A(x) is being some irreducible factor of $\Phi_m(x)$ in $\mathbb{Z}_p[x]$. To give a more concrete explanation of E, let d be the order of p in $U(\mathbb{Z}_m)$, where U is the multiplicative group.

The elements of E are polynomials of degree at most d−1 with modulo-p integer coefficients, since deg(A(x))=d. It should be noted that n=φ(m)/d and φ is a Euler totient function (which is not to be confused with the cyclotomic polynomial). The ciphertext space S is similar to the plaintext space:

$$S = \frac{\mathbb{Z}_q[x]}{\Phi_m(x)}, \quad (2)$$

where instead of p there is the value q, which is a large composite number, and the value m is the same as that of the plaintext space. Typically q>>p and the natural embedding R→S is frequently employed.

It should be noted that as used herein, one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
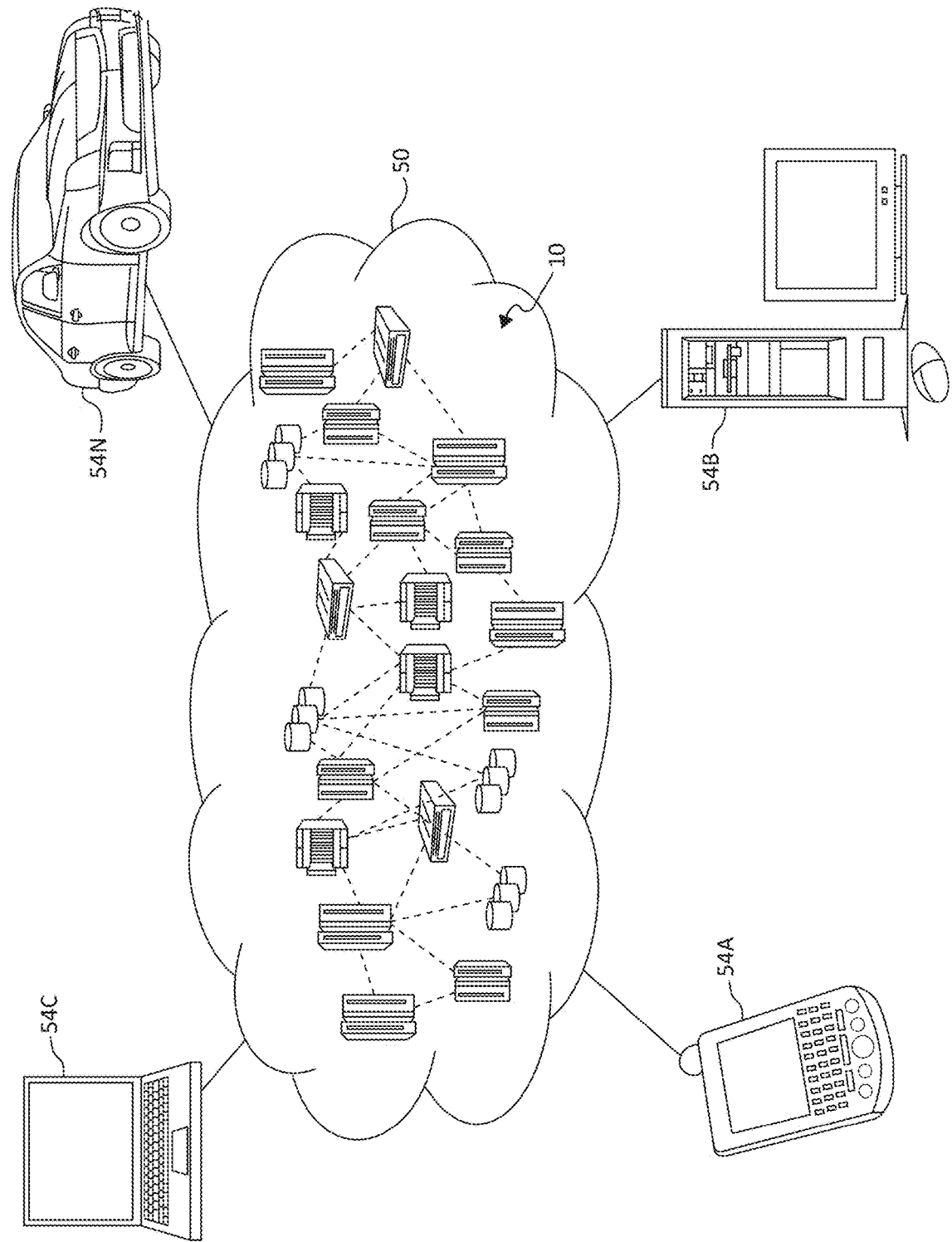
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
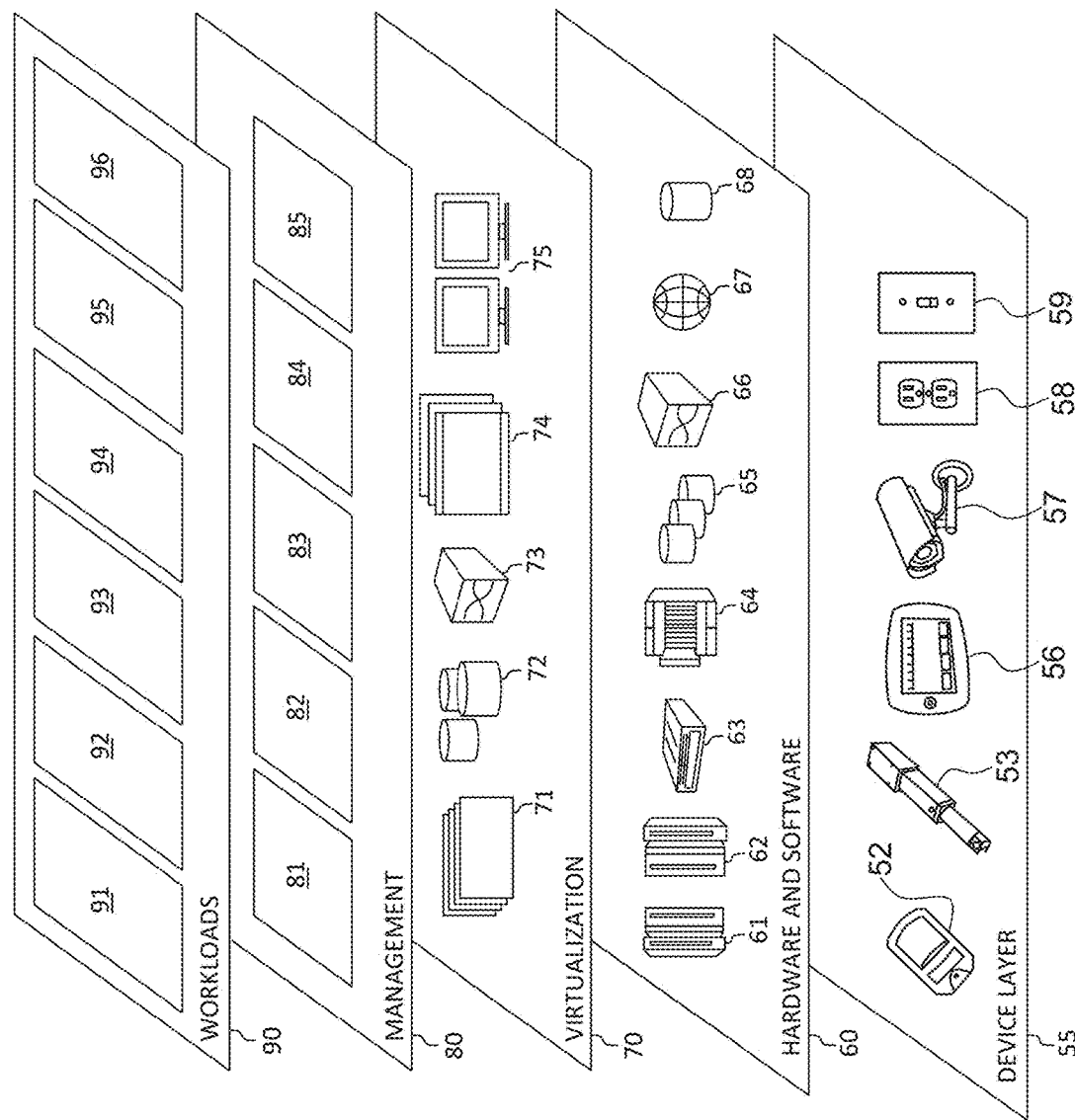
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for performing homomorphic encryption weighted lookup. In addition, workloads and functions 96 for performing homomorphic encryption weighted lookup may include such operations as data analytics, data analysis, and as will be further described, cryptographic switching functionality. One of ordinary skill in the art will appreciate that the workloads and functions 96 for performing homomorphic encryption weighted lookup may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
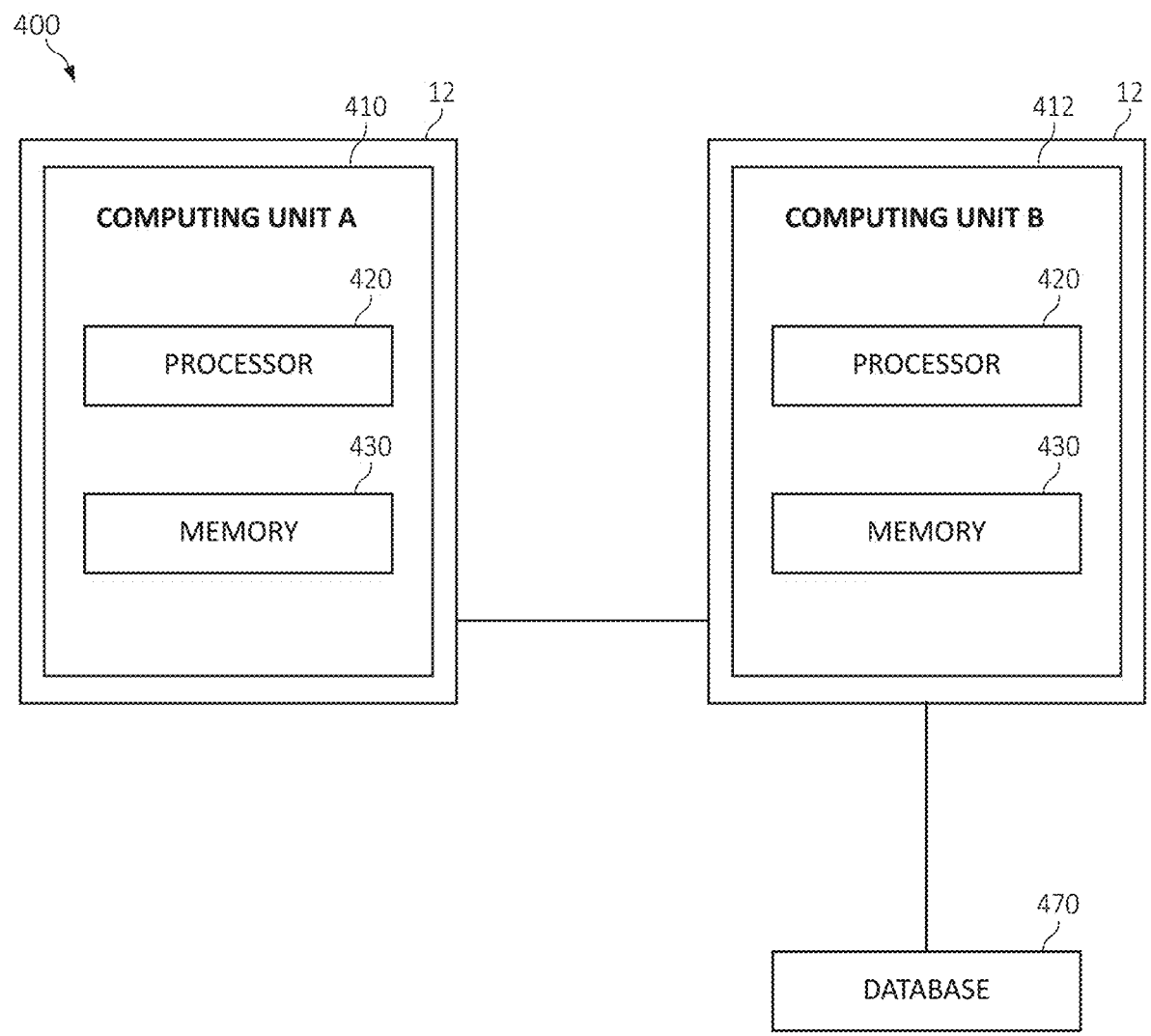
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. With the foregoing in mind, the module/component blocks of functional components 400 may also be incorporated into various hardware and software components of a system in accordance with the present invention. Many of the functional blocks 400 may execute as background processes on various components, either in distributed computing components, or on the user device, or elsewhere. Repetitive description of like elements, components, modules, services, applications, and/or functions employed in other embodiments described herein is omitted for sake of brevity.

A computing unit A 410 (e.g., a client) and a computing unit B 412 (e.g., a server) is shown, each incorporating a processing unit ("processor") 420 to perform various computational, data processing and other functionality in accordance with various aspects of the present invention. Both the computing unit A 410 and the computing unit B 412 may each be provided by the computer system/server 12 of FIG. 1. Both of the processing units 420 may be in communication with a memory 430. As one of ordinary skill in the art will appreciate, various functional operations may be performed in each of the computing unit A 410 and the computing unit B 412. Additionally, the various functional operations may be performed entirely or partially within the computing unit A 410 and the computing unit B 412 may be performed entirely or partially elsewhere within and/or between distributed computing components.

In general, the computing unit A 410 and the computing unit B 412, individually and/or collectively may perform one or more of the following operations for a homomorphic encryption weighted lookup operation.

In one aspect, selected data may be encoded and encrypted into an encrypted query for comparison using private set intersection (PSI) under homomorphic encryption (HE). An encrypted score may be determined according to data blocks of the selected data and a set of weights for each of the data blocks of the selected data to identify matches between the data and the encrypted query. The encrypted score may be decrypted and decoded to identify partial match/matches and/or complete match/matches between the encrypted query with the selected data. In one aspect, a partial match may include complete matches (e.g., depending on the encoded query, specific data and/or entries, and/or the overall context).

Additionally, homomorphic private and homomorphic public key pairs may be generated for homomorphic encryption of the selected data. In one aspect, the homomorphic public key pairs are necessary for encryption. A set of masks may be determined to generate the encrypted score, wherein the encrypted score is a weighted PSI score. The encrypted score may be provided to identify partial matching or complete matching between one or more of the data blocks of the selected data in the encrypted query. One or more weights and offsets of a weighted PSI scoring function may be configured for determining the encrypted score or performing a lookup operations. Geometric mean of weighted-offset arithmetic means of matches between one or more of the data blocks of the selected data, wherein the geometric mean of the weighted-offset arithmetic means of the matches are interpreted as a weighted PSI score.

In an additional aspect, the computing unit A 410 may transmit encrypted query data in the encrypted query to the computing unit B 412 to enable the computing unit B 412 to both determine the encrypted score according to data blocks of the selected data and a set of weights for each of the data blocks of the selected data and receive a score and/or perform a lookup operation. It should be noted that receiving a score and performing a lookup operation may require different configurations of the weights. Also, the lookup operation may require one or more data retrieval operations/steps.

The computing unit A 410 may receive from the computing unit B 412 the encrypted score. The computing unit A 410 may decrypt and decode the encrypted score to identify partial or complete matches between the encrypted query with the selected data.

Turning now to more specific operations of the computing unit A 410 (e.g., a client) and a computing unit B 412 (e.g., a server) consider the following.

Encoding

It should be noted that an encoding operation transforms data (e.g., transforms the data into the required plaintext algebra) for the homomorphisms to work/function properly. This means that encoding is done in the client for preparing the query before it is encrypted. Moreover, a server, in communication with the client, may also encode database entries, which is described below/herein.

In one aspect, computing unit A 410 may encode selected or relevant data into plaintext space so as to encrypt and perform a homomorphic encryption weighted lookup. First, a database such as, for example, database 470 may include N number of rows and M number of columns, where N and M are positive integers. Each entry in database 470 may be a "small" datum, such as a fixed-length integer and denoted by the variable "l" which is the number of bits of the fixed-length integer (and not the integer itself) required for each datum, so that all entries in database 470 may be uniformized as members of $\{0, 1, 2, \ldots, 2^l-1\}$ (e.g., values where l is equal to 32). However, larger or smaller values of l may be used if performance requirements or homomorphic encryption weighted lookup accuracy requirements necessitate it.

A base, b, may be selected for the encoding of the data entries. For example, b<p such that $b^d \geq 2^l$. It should be noted that such operations places constraints on p. Once b is selected, a number $z \in \{0, 1, 2, \ldots, 2^l-1\}$ is generated by taking its base-b expansion $\beta_0, \beta_1 \ldots \beta_{d-1}$ and embedding the $\beta_i$ values in the coefficients of a polynomial in E. Using this approach, the computing unit A 410 may be able to embed $n=\phi(m)/d$ data entries in one plaintext. For simplicity, the case where $n \geq N$ is described in order to map an entire column of the database 470 to one element of R (e.g., plaintext space). Thus, with M plaintext elements of R (where M would be manageable such as, for example, below 100), the computing unit A 410 is enabled to encode the entire database 470.

In one aspect, the plaintexts may be referred to as $\{D_i\}_{i=0}^{M-1}$ (e.g., the encoded database), which are compatible with BGV ciphertexts and operations can be performed between them. Next, the computing unit A 410 may encode a query, which is a set of M integers broken into base-b representation and encoded as previously stated, into a set of M plaintexts $\{P_i\}_{i=0}^{M-1}$. Here each $P_i$ is an N-fold repetition of a query datum corresponding to column i. These plaintexts may then be encrypted under the BGV scheme into the query ciphertexts or "encrypted query" ("Q") may be defined as $\{Q_i\}_{i=0}^{M-1}$.

It should be noted that such operations described may be considered a basic encoding scheme one or more scenarios where the entire database fits into one element of R. However, it may be more common or typical to have N>n and it may be therefore necessary to break the database 470 up into disjoint shards. Thus, it should be noted that the computing unit B 412 may replicate the query several times and perform the entire operation on all shards, combining the result at the end.

Comparison

In one aspect, an encrypted query (e.g., $\{Q_i\}_{i=0}^{M-1}$) may be transmitted from the computing unit A 410 to the computing unit B 412, which holds the encoded (plaintext) database (e.g., database 470) and may be typical where the computing unit B 412 knows its own database (e.g., database 470). Some variants of the (e.g., database 470) may involve encrypting the database 470 with the same key also, in situations where the data must be kept secret from the computing unit B 412.

Once the computing unit B 412 receives the encrypted query (e.g., $\{Q_i\}_{i=0}^{M-1}$), the goal for the computing unit B 412 is to compute a weighted set-intersection score (e.g., a weighted PSI score) as defined by a configurable partitioning of the set of columns and weight set.

Mask Generation

The first step is to compute a mask by the computing unit B 412 by determining/computing ciphertexts $\{\Delta_i\}_{i=0}^{M-1}$ as follows:

$$\Delta_i := Q_i - D_i \quad (3),$$

where the minus operator-: S×R→S may be an inexpensive operation in implementations of the BGV scheme.

Next, the computing unit B 412 may perform an operation on the $\Delta_i$ values which maps all nonzero values to 0 and maps 0 to 1. Since A(x) is irreducible, all nonzero elements of E are units such that $|U(E)|=|E\setminus\{0\}|=p^d-1$. Therefore, $g(x)^{p^d}=1$ for any nonzero $g(x) \in E$ by Lagrange's theorem and $0^{p^d}_{-1}=0$ so exponentiation by $p^d-1$ provides the computing unit B 412 with such capability. This exponentiation can be naïvely implemented by squaring, resulting in a circuit with multiplication depth approximately $\log(p^d-1)$. However, a more efficient implementation can be achieved via repeated application of the Frobenius automorphism $\sigma: R \rightarrow R$ defined by $\sigma: x \rightarrow x^p$ and libraries supporting BGV may implement efficient maps on the ciphertext space which provides the Frobenius automorphism on R when conjugated by the encryption function.

It should be noted that for any g (x) ∈ R, the follow equation is provided:

$$f(g(x)) := 1 - \prod_{i=0}^{d-1} \sigma^i(g(x)^{p-1}) = \begin{cases} 1, & \text{if } g(x) = 0 \\ 0, & \text{otherwise} \end{cases}, \quad (4)$$

where $\sigma^i$ denotes composition rather than multiplication. Such operations requires only O(log(p-1)) multiplication depth, followed by d Frobenius automorphisms and another O(log(d)) multiplication depth. The ciphertext analogue of $f$ is denoted as $f'$: S→S then computing $f'(\Delta_i)$ for each i provides a set of masks $\{K_i\}_{i=0}^{M-1}$, which may be used to generate the weighted set-intersection score. It should be noted that the function $f$ is defined for the plaintext space R and has a natural analogue on the ciphertext space S due to the nature of the HE.

Weighted Set-Intersection Score Computation

In one aspect, the present invention provides for the computation of a private set-intersection score (e.g., the weighted PSI score). As previously mentioned, the present invention may define the set-intersection score which depends on 1) a collection of column subsets and 2) a set of weights.

That is, the collection of column subsets that are referred to as data blocks (e.g., collection of column subsets) Each data block may be written in the form $F_i$. This notion may be formalized as a partitioning/cover of the set of columns, which may be considered to be a multi-set $\{F_i\}_{i=0}^{k-1}$ where k is the number of data blocks, each $F_i \subseteq \{0, 1, \ldots, M-1\}$, and the $F_i$'s are not necessarily disjoint. The $F_i$'s could be generalized as a multi-set.

As stated above, the set-intersection score may also depend on the set of weights $\tau_{F_i}$ for each data block $F_i$, which may be considered to be functions $\tau_{F_i}: F_i \rightarrow \mathbb{Z}_p$ for convenience of notation along with a constant term $\mu_{F_i}$.

The values μ, τ can also be encrypted and sent by the client (e.g., the computing unit A 410) or another third party to a server (e.g., the computing unit B 412) as ciphertexts instead of plaintexts, offering an increased level of privacy regarding the nature of the query, at a cost of increased multiplicative circuit depth. Another drawback is that the server (e.g., the computing unit B 412) no longer has any ability to check the search policy implied by the values chosen. Given these values, the present invention may define the weighted PSI score function a as the following equation:

$$a(\{K_j\}_{i=0}^{M-1}) = \Pi_{i=0}^{k-1}(\mu_{F_i} + \Sigma_{j \in F_i} \tau_{F_i}(j) K_j), \quad (5)$$

and is cost effective in computing power for computing for small values of k, where K are the masks (e.g., a set of masks $\{K_i\}_{M-1}$) and the k is the number of data blocks. It should be noted that caution should be taken when selecting the $\mu$, and the $\tau$ values, as well as the partitioning multiset, so as to ensure that there is no overflow of the modulo-p capabilities. For example, if large values of $\tau$, $\mu$, and a large number of F sets are used, then it is possible that the computation of alpha ("a") would result in a number larger than p. If this happens, no useful information can be gained, since the resultant value when decrypted will "wrap back around" into the range $\{0, 1, \ldots, p-1\}$, as is the nature of modular arithmetic. To verify and check, the following equation may be computed:

$$a(\{1\}_{i=0}^{M-1}) = \Pi_{i=0}^{k-1}(\mu_{F_i} + \Sigma_{j \in F_i} \tau_{F_i}(j) K_j), \quad (6)$$

which may be the score obtained by a perfect database match and ensure that this value is at most p–1. If not, this can be mitigated by increasing p, making the subsets $F_i$ smaller, decreasing the values of k, decreasing the offset values $\mu$, or decreasing the weight values $\tau$. The interpretation of the PSI score function a is essentially a weighted geometric mean of weighted offset arithmetic means of matches across subsets of the columns of the database. It should be noted that an arithmetic mean is simply a summation followed by a division (where the division is omitted for simplicity and computational ease). A weighted arithmetic mean is similar, except each summand is multiplied by a "weight" and in the present invention, these weights are the values (e.g., $\tau$). The "offset" terms are the $\mu$ values, so named because they are essentially an "offset from zero" and a minimal value. Now, a geometric mean is a product followed by raising to a certain power, the power being omitted for computational ease. Hence the scoring function alpha (e.g., PSI score function a) of the present invention is a combination of these; it is essentially a geometric mean of weighted and offset arithmetic means.

This has the property of allowing data blocks, which give more importance to some columns than others, according to the $\tau$ values used in the weighted offset arithmetic mean terms. Furthermore, the $\mu$ terms can be configured in order to customize the maximum impact that said data block can have on the overall score a due to the multiplication performed. For example, if $\mu_{F_i}=0$, this means that the data block $F_i$ must match at least partially, otherwise the overall score will be 0. If $\mu_{F_i}$ is much greater than the values of $\tau_{F_i}$, on the other hand, that data block will not significantly impact the overall score even if the $F_i$ columns do not match well. Another property of the PSI score function a is the fact that the present invention may have duplicate data blocks (i.e., $F_i = F_j$ for some $i \neq j$). This results in the geometric mean becoming a weighted geometric mean instead, since the product in equation (5) can then contain powers of terms.

Usage Examples

To further illustrate, consider the following examples. Database Lookup (HE Weighted Lookup)

Rather than simply using a system which generates a score, the present invention may instead use the PSI score to perform more complicated value extraction operations. In particular, suppose there is a system (e.g., system 400) in which the database such as, for example, database 470 has five columns (e.g., M=5 columns). In this system, the system 400 may use k=4 and take our multiset of data blocks as the whole set repeated four times (e.g., $F_0 = F_1 = F_2 = F_3 = \{0,1,2,3,4\}$.)

Given this configuration, the present invention may implement a family of database lookups including logical operations corresponding to the additions and multiplications present in the formula for a, according to the client (e.g., the computing unit A 410) desire which is encoded in the weights. For example, if the client (e.g., the computing unit A 410) would like to match column 0 and 2 and (3 or 4), the client (e.g., the computing unit A 410) may set weights as follows:

$$\tau_{F_0}(j) = \mathbb{1}_{j=0}$$

$$\tau_{F_1}(j) = \mathbb{1}_{j=2}$$

$$\tau_{F_2}(j) = \mathbb{1}_{j \in \{3,4\}}$$

$$\tau_{F_3}(j) = 0$$

where $\mathbb{1}$ is an indicator function defined by:

$$\mathbb{1}_p = \begin{cases} 1, & \text{if } P \text{ is true} \\ 0, & \text{if } P \text{ is false} \end{cases}$$

In this example, the offset values may be set as follows:

$$\mu_{F_0} = 0$$

$$\mu_{F_1} = 0$$

$$\mu_{F_2} = 0$$

$$\mu_{F_3} = 0$$

and this ensures that the first three terms in the product will correspond to the three logical conditions imposed, with the last one being a constant true value due to the $\mu$ values.

At this point, the PSI score function a may be used as a scoring function and also as a matching mask which may be raised to the p–1$^{th}$ power to result in 1 for matching database rows and 0 for non-matching database rows. It should be noted that this step can be avoided in the case where only AND operations are permitted. This can then be multiplied by the database to result in a value to return to the client. Optionally, the results can be combined via addition before being returned to the client, but it should be noted that one limitation of this additive combination step is that matches must be unique, otherwise multiple matches will interfere when added. Alternatively, the entries of the mask may be added without ever multiplying by the values thereby performing a count operation as opposed to value retrieval. Smaller sets for the $F_i$'s may be used for different possibilities of database lookups. For example, the $F_i$'s may be selected to be singletons if no logical disjunctions are required. Also, the set of possible logical operations which can be performed by reconfiguring the $F_i$'s is too large to be described here.

Continuing now with the example of database lookup for the purpose of clarity, suppose there is a database (e.g., database 470) against which it is desired to perform the HE lookup operation, which would have the following format $$D := \begin{pmatrix} d_{00} & d_{01} & d_{02} & d_{03} & d_{04} \\ d_{10} & d_{11} & d_{12} & d_{13} & d_{14} \\ \vdots & \vdots & \vdots & \vdots & \vdots \\ d_{(N-1)0} & d_{(N-1)1} & d_{(N-1)2} & d_{(N-1)3} & d_{(N-1)4} \end{pmatrix}$$

in the earlier notation, there is the ith column $(d_{0i}, d_{1i}, \ldots, d_{(N-1)i})^T$ encoded as $D_i$. There may also be a query of the same format:

$$Q := \begin{pmatrix} e_0 & e_1 & e_2 & e_3 & e_4 \\ e_0 & e_1 & e_2 & e_3 & e_4 \\ \vdots & \vdots & \vdots & \vdots & \vdots \\ e_0 & e_1 & e_2 & e_3 & e_4 \end{pmatrix}$$

Linking back to the earlier notation again, there is the ith column $(e_i, e_i, e_i, \ldots, e_i)^T$ encoded as $Q_i$. At this point, a subtraction operation may be performed, which results in a matrix of differences with columns equal to the $\Delta_i$ values:

$$\Delta := Q - D = \begin{pmatrix} \delta_{00} & \delta_{01} & \delta_{02} & \delta_{03} & \delta_{04} \\ \delta_{10} & \delta_{11} & \delta_{12} & \delta_{13} & \delta_{14} \\ \vdots & \vdots & \vdots & \vdots & \vdots \\ \delta_{(N-1)0} & \delta_{(N-1)1} & \delta_{(N-1)2} & \delta_{(N-1)3} & \delta_{(N-1)4} \end{pmatrix}$$

Next, the scoring function $f'$ may be applied to the columns of this matrix, giving another matrix of the same format:

$$K :=$$

$$f'(\{\Delta_0, \Delta_1, \Delta_2, \Delta_3, \Delta_4\}) = \begin{pmatrix} \kappa_{00} & \kappa_{01} & \kappa_{02} & \kappa_{03} & \kappa_{04} \\ \kappa_{10} & \kappa_{11} & \kappa_{12} & \kappa_{13} & \kappa_{14} \\ \vdots & \vdots & \vdots & \vdots & \vdots \\ \kappa_{(N-1)0} & \kappa_{(N-1)1} & \kappa_{(N-1)2} & \kappa_{(N-1)3} & \kappa_{(N-1)4} \end{pmatrix}$$

with columns earlier referred to as $K_i$.

Now, using the values of $\tau$ and $\mu$, the the weighted PSI score function $a$ becomes the following equations with values of $\tau$ and $\mu$:

$$\alpha(\{K_0, K_1, K_2, K_3, K_4\}) =$$

$$(\mu_{F_0} + \tau_{F_0}(0)K_0 + \tau_{F_0}(1)K_1 + \tau_{F_0}(2)K_2 + \tau_{F_0}(3)K_3 + \tau_{F_0}(4)K_4)$$

$$(\mu_{F_1} + \tau_{F_1}(0)K_0 + \tau_{F_1}(1)K_1 + \tau_{F_1}(2)K_2 + \tau_{F_1}(3)K_3 + \tau_{F_1}(4)K_4)$$

$$(\mu_{F_2} + \tau_{F_2}(0)K_0 + \tau_{F_2}(1)K_1 + \tau_{F_2}(2)K_2 + \tau_{F_2}(3)K_3 + \tau_{F_2}(4)K_4)$$

$$(\mu_{F_3} + \tau_{F_3}(0)K_0 + \tau_{F_3}(1)K_1 + \tau_{F_3}(2)K_2 + \tau_{F_3}(3)K_3 + \tau_{F_3}(4)K_4)$$

$$= (0 + 1 * K_0 + 0 * K_1 + 0 * K_2 + 0 * K_3 + 0 * K_4)$$

$$(0 + 0 * K_0 + 0 * K_1 + 1 * K_2 + 0 * K_3 + 0 * K_4)$$

$$(0 + 0 * K_0 + 0 * K_1 + 0 * K_2 + 1 * K_3 + 1 * K_4)$$

$$(1 + 0 * K_0 + 0 * K_1 + 0 * K_2 + 0 * K_3 + 0 * K_4)$$

$$= (K_0)(K_2)(K_3 + K_4),$$

Recalling that all of these operations occur entry wise, the ith entry of this expression is as follows:

$$\alpha(\{\kappa_{i0}, \kappa_{i1}, \kappa_{i2}, \kappa_{i3}, \kappa_{i4}\})_i = \begin{cases} 2, & \text{if } \kappa_{i0} = \kappa_{i2} = \kappa_{i3} = \kappa_{i4} = 1 \\ 1, & \text{if } \kappa_{i0} = \kappa_{i2} = \kappa_{i3} = 1 \text{ and } \kappa_{i4} = 0 \\ 1, & \text{if } \kappa_{i0} = \kappa_{i2} = \kappa_{i4} = 1 \text{ and } \kappa_{i3} = 0 \\ 0, & \text{otherwise.} \end{cases}$$

Thus, using Fermat's little theorem, the weighted PSI score is raised to the to $p-1^{th}$ power to obtain:

$$\alpha(\{\kappa_{i0}, \kappa_{i1}, \kappa_{i2}, \kappa_{i3}, \kappa_{i4}\})_i^{p-1} = \begin{cases} 1, & \text{if } \kappa_{i0} = \kappa_{i2} = \kappa_{i3} = \kappa_{i4} = 1 \\ 1, & \text{if } \kappa_{i0} = \kappa_{i2} = \kappa_{i3} = 1 \text{ and } \kappa_{i4} = 0 \\ 1, & \text{if } \kappa_{i0} = \kappa_{i2} = \kappa_{i4} = 1 \text{ and } \kappa_{i3} = 0 \\ 0, & \text{otherwise.} \end{cases}$$

$$= \begin{cases} 1, & \text{if } \kappa_{i0} = 1 \wedge \kappa_{i2} = 1 \wedge (\kappa_{i3} = 1 \vee \kappa_{i4} = 1) \\ 0, & \text{otherwise.} \end{cases}$$

which is exactly the mask required for the logical condition requested by the client (e.g., the computing unit A 410). By multiplying this by the database values or the original tuple/row the value desired by the client (e.g., the computing unit A 410) may be extracted. If it is known that the values fulfilling the logical condition will be unique, then the server (e.g., the computing unit B 412) may accumulate with addition (e.g., essentially an inner product) and return only one value, instead of a set of values with the rest zeroed out.

Direct Private Set-Intersection Score Usage

Once $a(\{K_j\}_{i=0}^{M-1})$ has been computed by the server (e.g., the computing unit B 412), it can be returned to the client (e.g., the computing unit A 410) immediately without performing a HE lookup operation, who may decrypt it. The client (e.g., the computing unit A 410) will then be able to see how well each database row matches with their query, according to a degree/level of importance defined by the values of $\tau$ and $\mu$. It should be noted that this does leak some information about the database 470, namely the position of each match in the database 470. In some variants, it may be desired to protect this information to varying extents. Randomizing the order of the values returned may be performed by the server (e.g., the computing unit B 412) using slot permutation capabilities present in typical implementations of a BGV scheme, which would prevent the client from learning this information. Even more expensively, the server may reduce a set of n scores to a maximum of all of these scores using thresholding functions.

Consider now the following example in which the weights are set differently, so that the score is more granular and may be of interest when returned immediately. Suppose the database has M=5 columns, where the columns correspond to data in Table 1 depicting a mapping between column index and data in that column in a database after some preprocessing such as hashing.

TABLE 1

| COLUMN NUMBER | COLUMN MEANING |
| --- | --- |
| 0 | MAKE |
| 1 | MODEL |
| 2 | REGISTRATION NUMBER |
| 3 | ENGINE SIZE |
| 4 | COLOR |

Suppose further that the client wishes to perform queries which answer questions of the form, for example, "how well does this query match entries of the database?" in a non-binary fashion. At this point, k=4 may be selected and the data blocks may be set up-front as, for example:

$$F_0 = \{0, 1, 2, 3, 4\}$$

$$F_1 = \{3, 4\}$$

$$F_2 = \{0\}$$

$$F_3 = \{1\}$$

and the client has the capability of defining a rich class of scoring importance via the values of $\tau$ and $\mu$. For example, consider a law enforcement agency desiring to enquire about a vehicle based on an eyewitness account of a car. The law enforcement agency may be issuing queries against various small car park ANPR ("Automatic Number Plate Recognition") databases to determine which may offer leads. The eyewitness account may provide differing degrees/levels of importance of attributes since the eyewitness may have differing degrees of certainty about the attributes of the sighted car (e.g., did not see the registration plate but is certain about the make and fairly confident about the model of the car). In this case, the law enforcement client might set, for example:

$$\mu_{F_0} = 1, \tau_{F_0}(j) = \begin{cases} 0, & \text{if } j = 0 \\ 7, & \text{if } j = 1 \\ 0, & \text{if } j = 2 \\ 1, & \text{if } j = 3 \\ 3, & \text{if } j = 4 \end{cases}$$

$$\mu_{F_1} = 5, \tau_{F_1}(j) = \begin{cases} 1, & \text{if } j = 3 \\ 2, & \text{if } j = 4 \end{cases}$$

$$\mu_{F_2} = 0, \tau_{F_2}(0) = 1$$

$$\mu_{F_3} = 1, \tau_{F_3}(1) = 1$$

Then, using the notation of the previous subsection, our score function would become:

$$a(\{K_0, K_1, K_2, K_3, K_4\}) = (1 + 7K_1 + K_3 + 3K_4)(5 + K_3 + 2K_4)(K_0)(1 + K_1)$$

where this weighted PSI score is a customized aggregate of set-intersection scores and has desirable properties, such as, for example, 1) non-matching "MAKE" of table 1 results in zero score due to the $K_0$ term, 2) no other non-matching feature will zero the score, 3) a non-matching "MODEL" of table 1 drastically impacts the score but does not zero it, 4) the "REGISTRATION NUMBER" of table 1 has no impact whatsoever, 5) the "ENGINE SIZE" of table 1 has minimal but non-zero impact, 6) "COLOR" of table 1 has low impact but larger impact than engine size.

Thus, in the case of the ciphertext values of $\tau$ and $\mu$ conceals the intent of the client to the server since the client have been uniquely concerned with model and engine size as far as the server is aware, for example. Of course, the weighted PSI score requires a larger value of p than in the previous section due to the larger numbers appearing in values of $\tau$ and $\mu$. However, this is not too problematic, since the present embodiment results in never having to exponentiate by p−1, unlike the previous section (e.g., for the weighted PSI scoring Fermat's little theorem is not applied). This score is returned directly to the client once calculated, without needing to be operated on further for anything such as value retrieval.

Identity Matching for Entity Resolution

Consider the following example in which the server (e.g., the computing unit B 412) holds a graph G=(V, E) with V as the set of vertices and E⊂V×V the set of edges. First, it is desirable to explain the undirected, unweighted case. In this case, the goal is for the client (e.g., the computing unit A 410) to query/ask the question "how similar is this vertex V to all of the existing vertices in the graph?" without revealing V to the server. In order to resolve this, first, an encoding of the graph is fixed into the database structure (e.g., database 470) as follow with N=M=|V| and fix a public ordering $V_0, V_1, V_{N-1}$ of the vertex set V. It should be noted that "fix a public ordering" also means "establishing an ordering" and ensure all parties/entities (e.g., the public) are aware of the ordering and will not change from this point forward. That is, both parties (e.g., the client and the server) know this ordering. Now, the ith row of the database is allowed to have the jth entry equal to 1 if $V_iV_j \in$ E and 0 if $V_iV_j \notin$ E.

It should be noted that the database (e.g., a binary database) is encoded and the query can be encoded in the exact same way. For a query vertex $V_*$, the client must form the binary vector given by 1's in the places corresponding to the neighbours of V and 0's elsewhere. In the discussion above relating to "encoding," this query may consist of M=|V| plaintexts $\{P_i\}_{i=0}^{M-1}$, where each $P_i$ is just a repetition of 1 if $V_*V_i$ is a connection, and a repetition of 0 otherwise. The client may then decide upon a set of "importances" (e.g., a degree/level of importance) for the connection and encoding these into the values of $\tau$ and $\mu$ as before. Then, the database lookup (e.g., a HE weighted lookup operation) and direct set-intersection score usage operation can be applied resulting in a score or database retrieval based on a graph-wise similarity.

It should be noted that one or more modifications to this setup may be used in order to extend and generalize this example. First, it should be noted that the database previously described is symmetric, since the graph G was taken to be undirected. However, this can easily be generalized to a directed graph by following precisely the same rules of encoding. In one aspect, the requirement of $V_iV_j \in$ E $\Leftrightarrow V_jV_i \in$ E, which is generally assumed, may be relaxed so that it no longer applies. The next generalization is to enable the use of weighted graphs. For example, if the graph corresponded to a social network of people who might know each other, the weight of an edge may be set to be equal to 0 if the people do not know each other, 1 if they are acquaintances, and 2 if they are friends. In this scenario, the weight is entered as the database entry so during the query phase there is a match only if the same edge exists with the exact same weight. Also, the weighting of the graph may be kept rather coarse-grained, (e.g., as in the case of $\{0, 1, 2\}$), since 'near misses' cannot be identified.

Figure 5:
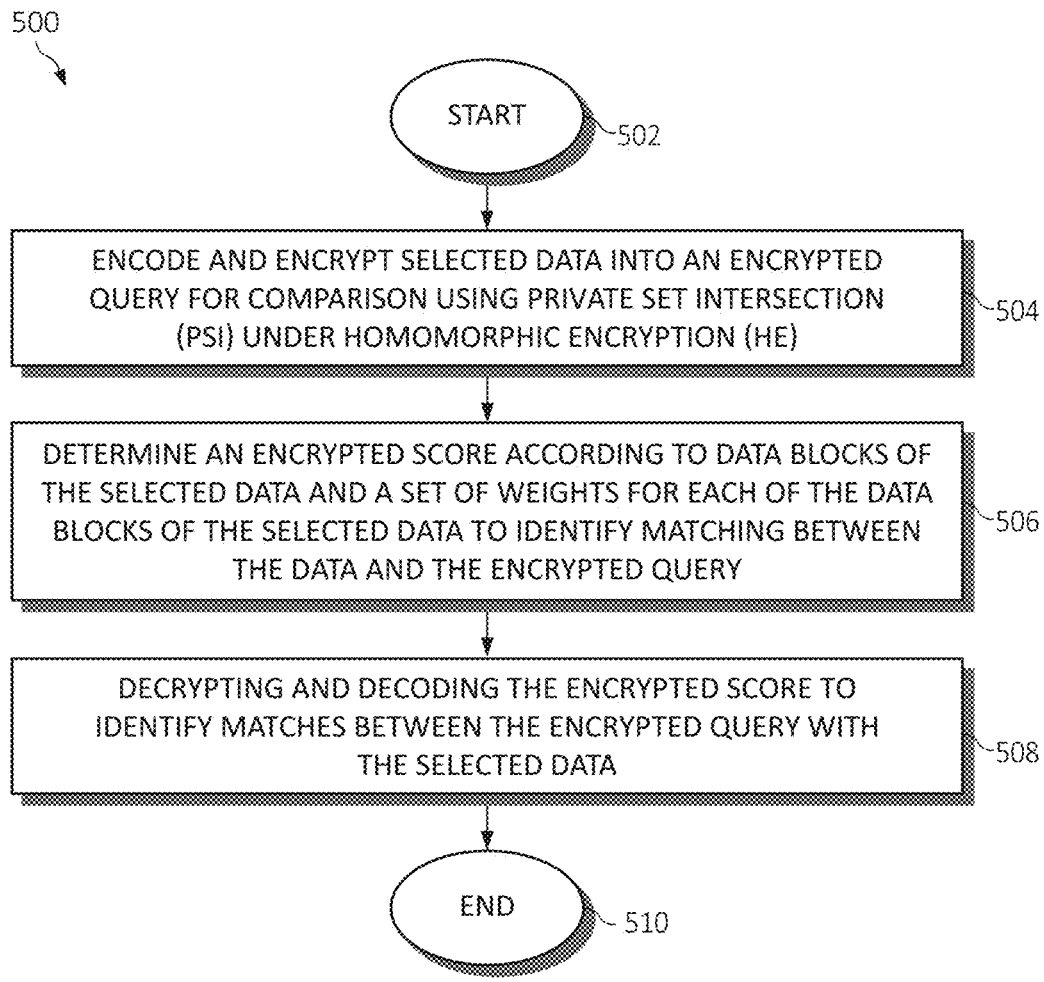
FIG. 5 is a flowchart diagram depicting an additional exemplary method for performing weighted partial matching under homomorphic encryption by a processor in which aspects of the present invention may be realized.

Turning now to FIG. 5, a method 500 for performing homomorphic encryption weighted scoring and/or lookup/retrieval operations by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. Also, one or more components, functionalities, and/or features of FIGS. 1-4 may be implemented in FIG. 5. The functionality 500 may start in block 502.

Selected data may be encoded and encrypted into an encrypted query for comparison using private set intersection (PSI) under homomorphic encryption (HE), as in block

504. An encrypted score may be determined according to data blocks of the selected data and a set of weights for each of the data blocks of the selected data to identify matches between the data and the encrypted query, as in block 506. The encrypted score may be decrypted and decoded to identify matches between the encrypted query with the selected data, as in block 508. The functionality 500 may end, as in block 510.

Figure 6:
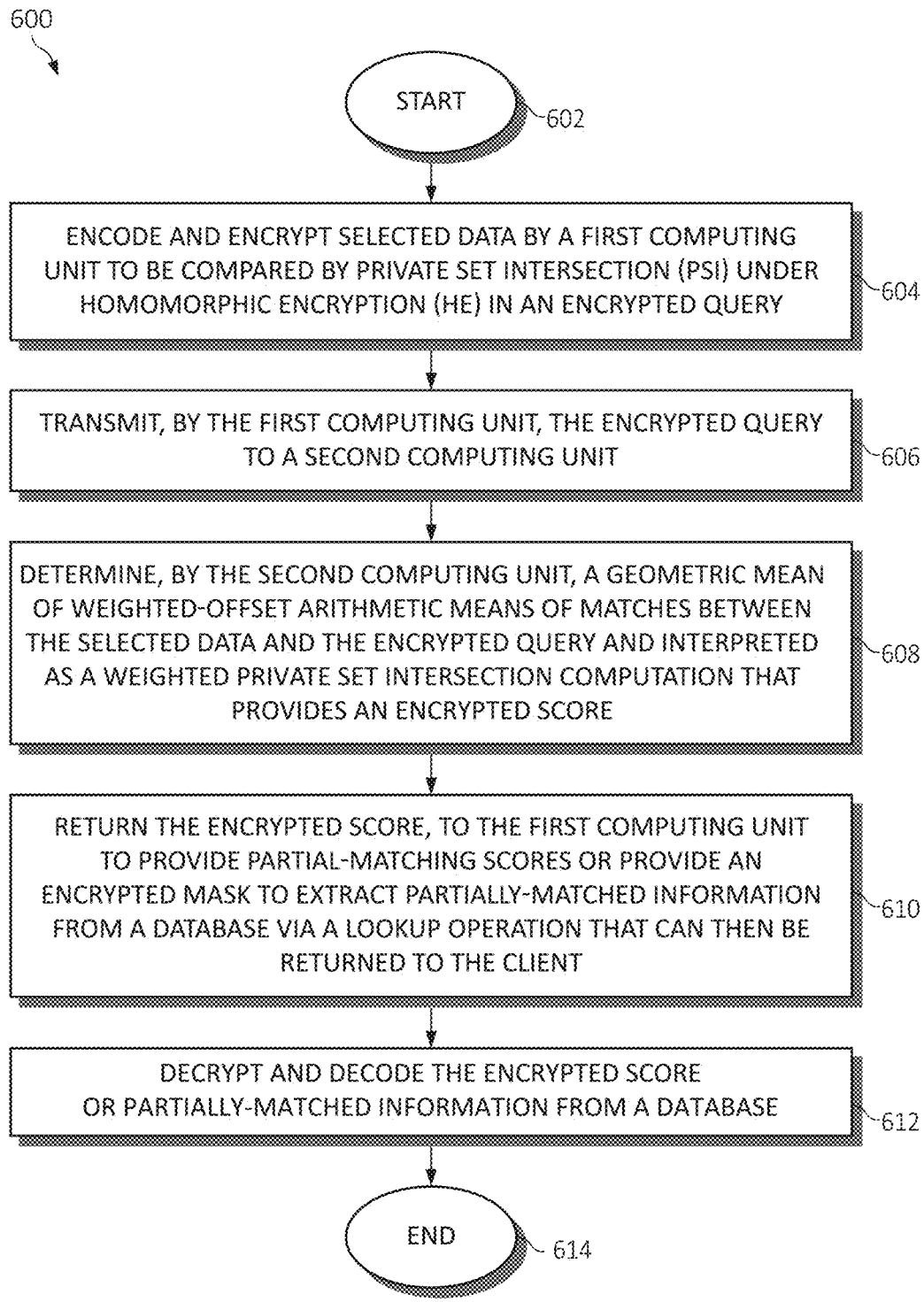
FIG. 6 is an additional flowchart diagram depicting an exemplary method for performing weighted partial matching under homomorphic encryption in which aspects of the present invention may be realized.

Turning now to FIG. 6, a method 600 for performing homomorphic encryption weighted scoring and/or lookup/retrieval operations by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. Also, one or more components, functionalities, and/or features of FIGS. 1-5 may be implemented in FIG. 6. The functionality 600 may start in block 602.

Selected data may be encoded and encrypted by a first computing unit to be compared by private set intersection (PSI) under Homomorphic Encryption (H) in an encrypted query, as in block 604. The encrypted query may be transmitted by the first computing unit to a second computing unit, as in block 606. A geometric mean may be determined by the second computing unit, of weighted-offset arithmetic means of matches between the selected data and the encrypted query and interpreted as a weighted private set intersection computation that provides an encrypted score, as in block 608. The encrypted score may be returned to the first computing unit to provide partial-matching scores and/or provide an encrypted mask to extract partially-matched information from a database via a lookup operation that can then be returned to the client, as in block 610. The encrypted score or partially-matched information from a database may be decrypted and decoded, as in block 612. The functionality 600 may end, as in block 614.

Figure 7:
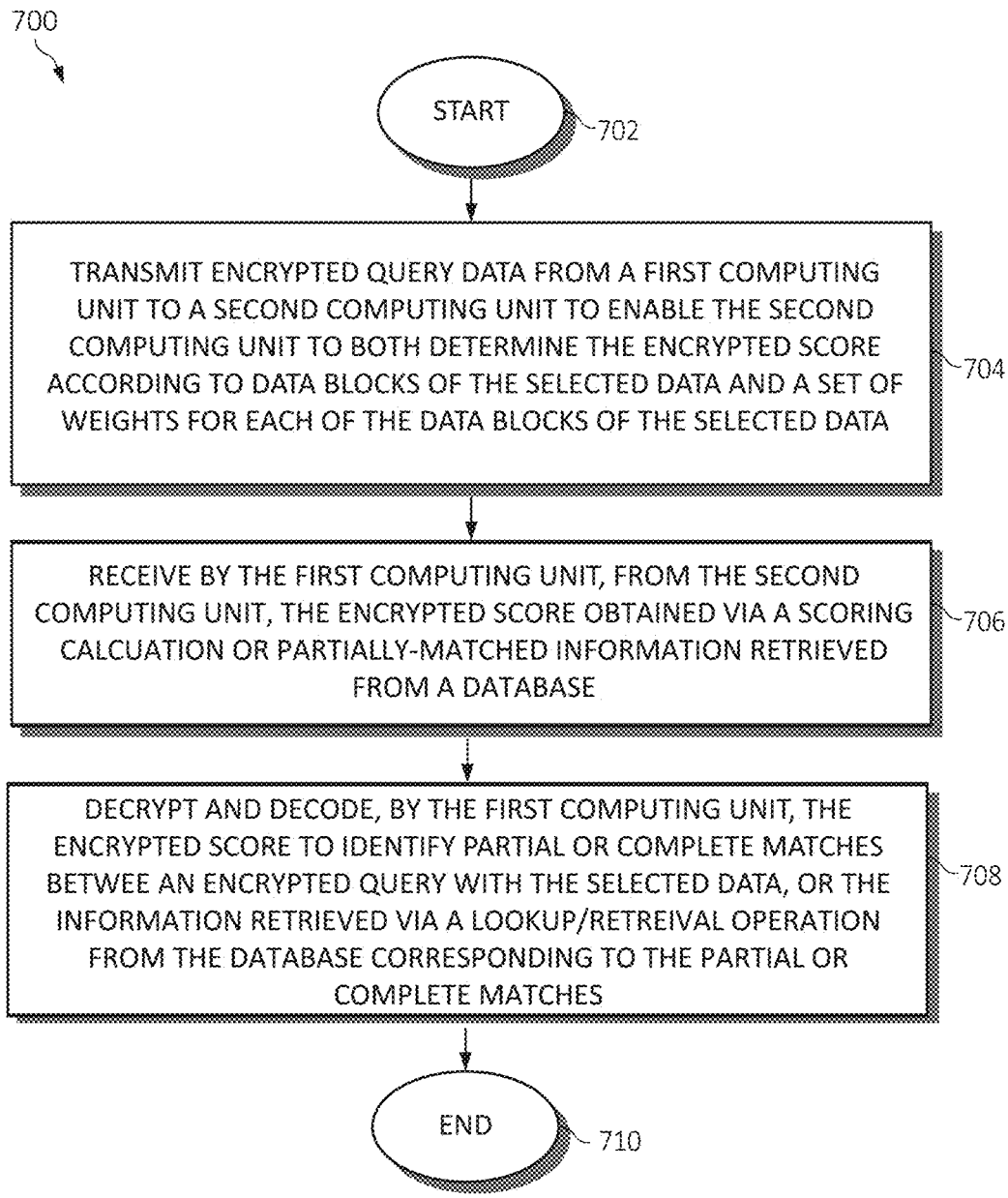
FIG. 7 is an additional flowchart diagram depicting an exemplary method for performing weighted partial matching under homomorphic encryption by a processor, again in which aspects of the present invention may be realized.

Turning now to FIG. 7, a method 700 for performing homomorphic encryption weighted scoring and/or lookup/retrieval operations by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. Also, one or more components, functionalities, and/or features of FIGS. 1-6 may be implemented in FIG. 7. The functionality 700 may start in block 702.

Encrypted query data may be transmitted in an encrypted query from a first computing unit to a second computing unit to enable the second computing unit to both determine the encrypted score according to data blocks of encryptedquery data and a set of weights for each of the data blocks of thy: encrypted query data, as in block 704. The encrypted score may be received by the first computing unit, from the second computing unit, the encrypted score obtained via a scoring calculation, which then may be used to perform a lookup/retrieval operation obtained by a scoring calculation or partially-matched information retrieved from the database, as in block 706. The encrypted score may be decrypted and decoded by the first computing unit to identify partial or complete matches between an encrypted query with the selected data, or the information retrieved via a lookup/retrieval operation from the database corresponding to the partial or complete matches may be decrypted and decoded by the first computing unit, as in block 708. The functionality 700 may end, as in block 710.

In one aspect, in conjunction with and/or as part of at least one block of FIGS. 5-7, the operations of methods 500, 600, and 700 may include each of the following. The operations of methods 500, 600, and 700 may generate homomorphic private and homomorphic public key pairs for homomorphic encryption of the selected data. The operations of methods 500, 600, and 700 may determine a set of masks to generate the encrypted score, wherein the encrypted score is a weighted PSI score, provide the encrypted score to identify partial matching or complete matching between one or more of the data blocks of the selected data in the encrypted query, and/or configure one or more weights and offsets of a weighted PSI scoring function for determining the encrypted score or performing a lookup operations.

The operations of methods 500, 600, and 700 may determine a geometric mean of weighted-offset arithmetic means of matches between one or more of the data blocks of the selected data and the geometric mean of the weighted-offset arithmetic means of the matches may be interpreted as a weighted PSI score.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for performing weighted partial matching under homomorphic encryption by a processor, comprising:
   encoding and encrypting selected data into an encrypted query for comparison using private set intersection (PSI) under homomorphic encryption (HE);
   determining an encrypted score according to data blocks of the selected data and a set of weights for each of the data blocks of the selected data to identify matches between the selected data and the encrypted query, wherein determining the encrypted score includes determining a geometric mean of weighted-offset arithmetic means of matches between one or more of the data blocks of the selected data, and wherein the geometric mean of the weighted-offset arithmetic means of the matches are interpreted as a weighted PSI score; and
   decrypting and decoding the encrypted score to identify the matches between the encrypted query with the selected data.

2. The method of claim 1, further including generating homomorphic private and homomorphic public key pairs for the HE of the selected data.

3. The method of claim 1, further including determining a set of masks to generate the encrypted score, wherein the encrypted score is the weighted PSI score.

4. The method of claim 1, further including providing the encrypted score to identify partial matching or complete matching between the one or more of the data blocks of the selected data in the encrypted query.

5. The method of claim 1, further including configuring one or more weights and offsets of a weighted PSI scoring function for determining the encrypted score or performing a lookup operations.

6. The method of claim 1, further including:
   transmitting encrypted query data from a first computing unit to a second computing unit to enable the second computing unit to both determine the encrypted score according to the data blocks of the selected data and the set of weights for each of the data blocks of the selected data and perform a lookup operation;
   receiving, by the first computing unit, from the second computing unit the encrypted score; and
   decrypting and decoding, by the first computing unit, the encrypted score to identify partial or complete matches between the encrypted query with the selected data.

7. A system for performing weighted partial matching under homomorphic encryption in a computing environment, comprising:
   one or more computers with executable instructions that when executed cause the system to:
      encode and encrypt selected data into an encrypted query for comparison using private set intersection (PSI) under homomorphic encryption (HE);

determine an encrypted score according to data blocks of the selected data and a set of weights for each of the data blocks of the selected data to identify matches between the selected data and the encrypted query, wherein determining the encrypted score includes determining a geometric mean of weighted-offset arithmetic means of matches between one or more of the data blocks of the selected data, and wherein the geometric mean of the weighted-offset arithmetic means of the matches are interpreted as a weighted PSI score; and decrypt and decode the encrypted score to identify the matches between the encrypted query with the selected data.

8. The system of claim 7, wherein the executable instructions generate homomorphic private and homomorphic public key pairs for the HE of the selected data.

9. The system of claim 7, wherein the executable instructions determine a set of masks to generate the encrypted score, wherein the encrypted score is the weighted PSI score.

10. The system of claim 7, wherein the executable instructions provide the encrypted score to identify partial matching or complete matching between the one or more of the data blocks of the selected data in the encrypted query.

11. The system of claim 7, wherein the executable instructions configure one or more weights and offsets of a weighted PSI scoring function for determining the encrypted score or performing a lookup operations.

12. The system of claim 7, wherein the executable instructions:
   transmit encrypted query data in the encrypted query from a first computing unit to a second computing unit to enable the second computing unit to both determine the encrypted score according to the data blocks of the selected data and the set of weights for each of the data blocks of the selected data and perform a lookup operation;
   receive, by the first computing unit, from the second computing unit the encrypted score; and
   decrypt and decode, by the first computing unit, the encrypted score to identify partial or complete matches between the encrypted query with the selected data.

13. A computer program product for performing weighted partial matching under homomorphic encryption by a processor in a computing environment, the computer program product comprising a non-transitory computer-readable storage medium having computer-readable program code portions stored therein, the computer-readable program code portions comprising:

an executable portion that encodes and encrypts selected data into an encrypted query for comparison using private set intersection (PSI) under homomorphic encryption (HE);

an executable portion that determines an encrypted score according to data blocks of the selected data and a set of weights for each of the data blocks of the selected data to identify matches between the selected data and the encrypted query, wherein determining the encrypted score includes determining a geometric mean of weighted-offset arithmetic means of matches between one or more of the data blocks of the selected data, and wherein the geometric mean of the weighted-offset arithmetic means of the matches are interpreted as a weighted PSI score; and an executable portion that decrypts and decodes the encrypted score to identify the matches between the encrypted query with the selected data.

14. The computer program product of claim 13, further including an executable portion that generates homomorphic private and homomorphic public key pairs for the HE of the selected data.

15. The computer program product of claim 13, further including an executable portion that determines a set of masks to generate the encrypted score, wherein the encrypted score is the weighted PSI score.

16. The computer program product of claim 13, further including an executable portion that:
   provides the encrypted score to identify partial matching or complete matching between the one or more of the data blocks of the selected data in the encrypted query; or
   configures one or more weights and offsets of a weighted PSI scoring function for determining the encrypted score or performing a lookup operations.

17. The computer program product of claim 13, further including an executable portion that:
   transmits encrypted query data in the encrypted query from a first computing unit to a second computing unit to enable the second computing unit to both determine the encrypted score according to the data blocks of the selected data and the set of weights for each of the data blocks of the selected data and perform a lookup operation;
   receives, by the first computing unit, from the second computing unit the encrypted score; and
   decrypts and decodes, by the first computing unit, the encrypted score to identify partial or complete matches between the encrypted query with the selected data.

* * * * *